(12) United States Patent
Fleisher et al.

(10) Patent No.: US 7,694,234 B2
(45) Date of Patent: Apr. 6, 2010

(54) VIRTUAL MAGNIFYING GLASS WITH ON-THE FLY CONTROL FUNCTIONALITIES

(75) Inventors: Jacob Fleisher, Seattle, WA (US);
Joseph K. Ngari, Seattle, WA (US);
Kevin J. Smith, Redmond, WA (US);
Samuel A. Mann, Bellevue, WA (US);
Scott Mitchell Mail, Seattle, WA (US);
Michael Winser, Westport, CT (US);
David V. Esposito, North Haven, CT (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 11/196,511

(22) Filed: Aug. 4, 2005

(65) Prior Publication Data
US 2007/0033544 A1  Feb. 8, 2007

(51) Int. Cl.
G06F 3/048 (2006.01)
(52) U.S. Cl. .................................... 715/801
(58) Field of Classification Search ................. 715/786, 715/801, 802, 838, 768, 865
See application file for complete search history.

(56) References Cited

U.S. PATENT DOCUMENTS

| | | | |
|---|---|---|---|
| 5,298,890 A | 3/1994 | Kanamaru et al. | |
| 5,375,199 A | 12/1994 | Harrow et al. | |
| 5,598,183 A | 1/1997 | Robertson et al. | |
| 5,651,107 A | 7/1997 | Frank et al. | |
| 5,696,530 A | 12/1997 | Maejima | |
| 5,754,348 A | 5/1998 | Soohoo | |
| 5,808,601 A | 9/1998 | Leah et al. | |
| 5,808,604 A | 9/1998 | Robin | |
| 5,815,138 A | 9/1998 | Tsubaki et al. | |
| 6,128,006 A * | 10/2000 | Rosenberg et al. | 345/163 |
| 6,184,859 B1 | 2/2001 | Kojima | |
| 6,572,476 B2 * | 6/2003 | Shoji et al. | 463/33 |
| 6,590,583 B2 * | 7/2003 | Soohoo | 345/660 |
| 6,704,034 B1 | 3/2004 | Rodriguez et al. | |
| 7,009,600 B2 | 3/2006 | Jones et al. | |
| 7,275,219 B2 | 9/2007 | Shoemaker | |
| 2002/0011990 A1 * | 1/2002 | Anwar | 345/173 |
| 2003/0076363 A1 | 4/2003 | Murphy | |

(Continued)

OTHER PUBLICATIONS

International Search Report dtd Nov. 8, 2007, Appln. PCT/US06/30151.

(Continued)

Primary Examiner—Thanh T Vu
(74) Attorney, Agent, or Firm—Merchant & Gould P.C.

(57) ABSTRACT

A display screen magnifier is controllable by a user to magnify selected portions of a desktop including windows open on the screen. A moveable magnifier frame is provided, within which a magnified image is presented. The magnified image corresponds to screen content located within a magnification region underlying the magnifier frame, magnified to a set level of magnification. The magnifier is controllable through use of a user input device. At least one operational parameter of the magnifier can be adjusted, without interaction with on-screen objects and without taking focus away from the desktop or any windows open on the screen. In a particular embodiment of the invention, on-the-fly controllability of the magnifier includes its activation and deactivation, adjustment of the magnification level, and adjustment of the size of the magnifier frame.

20 Claims, 9 Drawing Sheets

U.S. PATENT DOCUMENTS

2003/0210262 A1 11/2003 Gahm et al.
2007/0030245 A1 2/2007 Ngari et al.
2007/0033542 A1 2/2007 Winser et al.
2007/0033543 A1 2/2007 Ngari et al.

OTHER PUBLICATIONS

Executable software/documentation: ABF Magnifying Tools.
Executable software/documentation: Bigshot.
Executable software/documentation: Dragnifier.
Executable software/documentation: ExactMouse2.0.
Executable software/documentation: LunarPlusDemo.
Executable software/documentation: Magnifixer.
Executable software/documentation: ZoomMagic.
Executable software/documentation: ZoomText.
MSDN website article: "About Hooks," 2005.
MSDN website article: "About Mouse Input," 2005.
MSDN website article: "CreateWindowEx Function," 2005.
MSDN website article: "Driver Chain Manager," 2005.
MSDN website article: "Window Features," 2005.
MDSN website article: "Win32 Hooks," 1994.
Specification (including claims) and drawings of U.S. Appl. No. 11/196,515, filed Aug. 4, 2005; inventors: Joseph K. Ngari et al.
Specification (including claims) and drawings of U.S. Appl. No. 11/196,510, filed Aug. 4, 2005; inventors: Michael Winser et al.
Claims of divisional of U.S. Appl. No. 11/196,515, filed Feb. 17, 2006; inventors: Joseph K. Ngari et al.
U.S. Office Action mailed Feb. 6, 2008 in U.S. Appl. No. 11/196,510.
U.S. Office Action mailed Jan. 23, 2008 in U.S. Appl. No. 11/196,515.
U.S. Final Office Action mailed Sep. 29, 2008 in U.S. Appl. No. 11/196,515.
U.S. Office Action mailed Apr. 3, 2008 in U.S. Appl. No. 11/356,142.
U.S. Office Action mailed Nov. 25, 2008 in U.S. Appl. No. 11/356,142.
US Final Office Action mailed Dec. 7, 2009 in U.S. Appl. No. 11/196,515.

* cited by examiner

Frame bitmap generation

Fig. 7

Mask bitmap generation

Stretch the captured image to the window size

Mask the stretched image

AND  (Lens Mask)

Frame the stretched image

ADD  (Frame)

Final window image

ADD  (Resize Hint Overlay, opacity 0 - 100%)

Final window image

VIRTUAL MAGNIFYING GLASS WITH ON-THE FLY CONTROL FUNCTIONALITIES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Various types of computer display screen magnification and zoom functionalities are known. In general, such magnifiers show a magnified copy of a portion of what appears on a computer's screen. Such functionalities have been provided as accessibility options for the visually impaired, and for other purposes, both as features provided within particular application software, and as specialty software intended to provide magnification/zoom functionalities generally available for use at an operating system (e.g., desktop) level and with user applications. For the visually impaired, such features may assist with the reading of small screen text and/or the discernment of icons and the like. More generally, magnifications and zoom functionalities can be useful within applications, and at an operating system (e.g., desktop) level, where it may be desired to enlarge all or a portion of screen objects or images.

An example of a user application providing zoom functionalities is Adobe Acrobat's .pdf document reader. In addition to standard toolbar zoom level selections via a dropdown menu, there are three pan and zoom related features: Loupe Tool, Pan & Zoom window, Dynamic Zoom tool.

With the Loupe Tool, a user controls the zoom level with a slider and controls the zoom position by clicking within a document. The zoomed area is represented by a rectangle on the document which is inversely proportional in size to the zoom level; the zoomed view is shown in a separate window. With the Pan & Zoom window feature, a resizable box is moveable on a document page presented in a small window. A document view provided in the background zooms and pans as the box is resized and moved. With the Dynamic Zoom tool, the regular cursor changes to a representation of a small magnifying glass signifying that a zoom mode has been entered. In this mode, a user is able to click on the document and drag up/down to dynamically zoom in and out, and is able to pan at the lateral edges of the document.

As a further example of a zoom feature provided as part of user application software, Digital Image Pro offers a set of controls on a tool bar provided as part of a window for navigating images. These include a slider based zoom level, return to 100% button, panning window, and a zoom to selection button. Similar to the Adobe Pan and Zoom feature, a box whose size is inversely proportional to a selected zoom level is moveable on an image presented in a small window. A magnified view of the image portion within the box is provided in the background.

Figure 4:
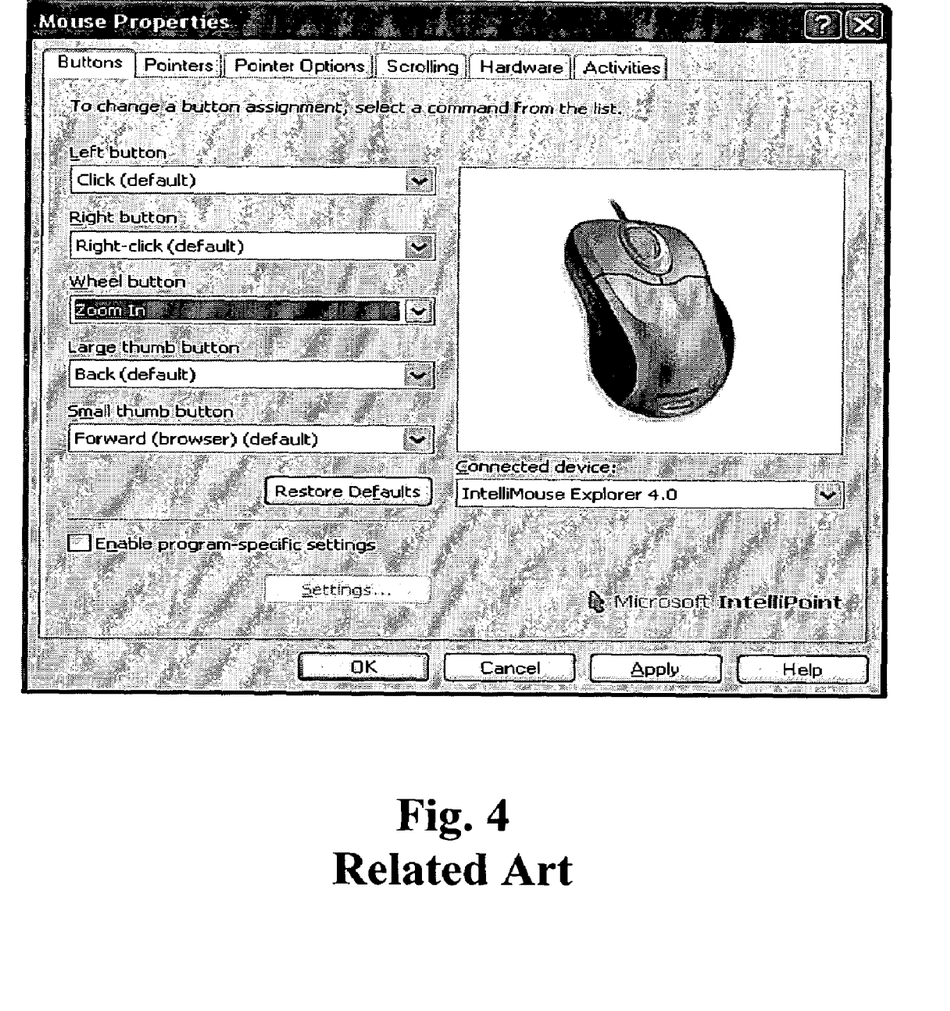
FIG. 4 shows a control panel provided as part of software for use with a Related Art computer mouse product of the present assignee.

Applications commonly implement zoom functionalities utilizing the input facilities of a computer mouse. For example, rolling the scroll wheel on a mouse in conjunction with pressing the CTRL key on the keyboard (CTRL+Wheel) may allow users to zoom in and out of applications. Each application has its own zooming increments, and scroll wheel zooming applies these increments. Other zoom options reside within the Microsoft IntelliPoint™ (mouse) software control panel, as shown in Related Art FIG. 4. On the Buttons tab, Zoom In and Zoom Out commands have recently been added as options for each mouse button. Some Microsoft keyboards have a Zoom control (e.g., "slider"), which operates under the control of Microsoft's IntelliType™ software.

As compared with magnifier software developed for use at an operating system (desktop) level, there is greater flexibility in the development of magnification and zoom features for a particular user application, as the application can be structured from "the ground up" to accommodate those features. Also, with an application specific magnifier, interaction of the magnifier with independently executing programs and their associated windows is generally not a concern. Zooming is easily achieved in an application. The application has an internal representation of the content to be displayed and if designed correctly it can display the content at different sizes or zoom levels. In Microsoft's Word® for example, you can zoom in until only a few lines show on the screen yet the text is very clear because the fonts are based on vector graphics (mathematical descriptions of the characters instead of bitmaps).

With a magnifier designed to be generally available for use with the desktop and with any other open windows, i.e., at an operating system (OS) level, the internal representation that an application may have for zoom functionalities is not available. Rather, magnification is performed by manipulation of a screenshot or bitmap of the output. Although this doesn't typically increase the detail beyond the applicable screen resolution, it does allow users to view user interface (UI) objects and text at larger sizes. The manner in which such a magnifier interacts with the various underlying screen elements and windows is of great importance; the nature of that interaction is likely to have a significant impact on the actual and perceived usability of the feature.

An example of an existing OS level screen magnification feature is the "Magnifier" of Microsoft's Windows XP® operating system. Magnifier is a display utility that makes the screen more readable for users who have impaired vision. It creates a separate window that displays a magnified portion of the screen, which portion is determined by the position of the pointing device cursor, e.g., mouse pointer. A user can change the magnification level via settings in the feature's control panel. The user can move or resize the Magnifier window, or drag it to the edge of the screen and lock it into place.

Figure 1:
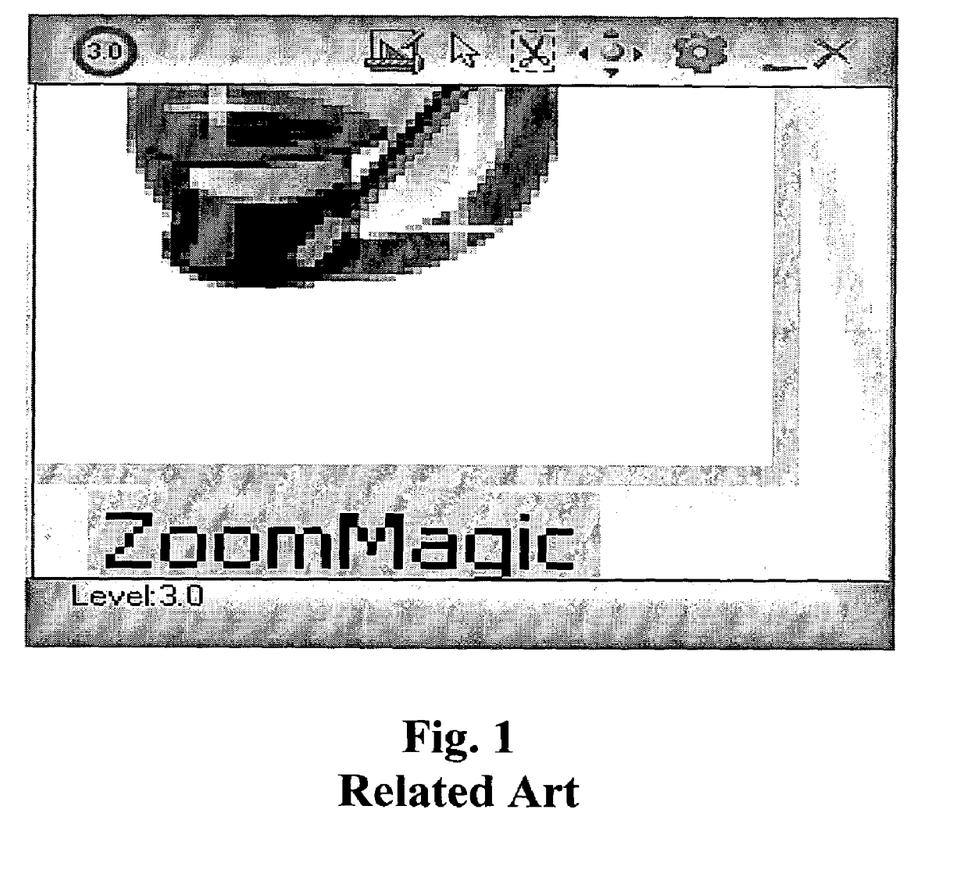
FIG. 1 is a screen shot showing an on-screen magnification window of a Related Art magnifier product.

A known screen magnification specialty application is Zoom Magic. When launched, this application opens a custom magnification window, as shown in FIG. 1. The window is sizable and moveable as a regular window. All tools/settings are available in the title bar. The window magnifies whatever is immediately beneath. The mouse cursor can move over the magnified content but it cannot interact with the content.

Referring to FIG. 1, there is a cursor tracking mode initiated by clicking the arrow button in the window title bar. Clicking on the different red arrows will dock the window top/bottom/left/right. Center undocks the window and reverts it to a regular window. This mode allows overlay of other open windows but does not allow interaction with underlying application windows within the magnification window. Cursor tracking can be toggled on/off by clicking the arrow button. There is an option to keep the magnification window on top of the desktop and any other open windows, but in this mode the magnified image does not update unless the magnification window is clicked.

Figure 2:
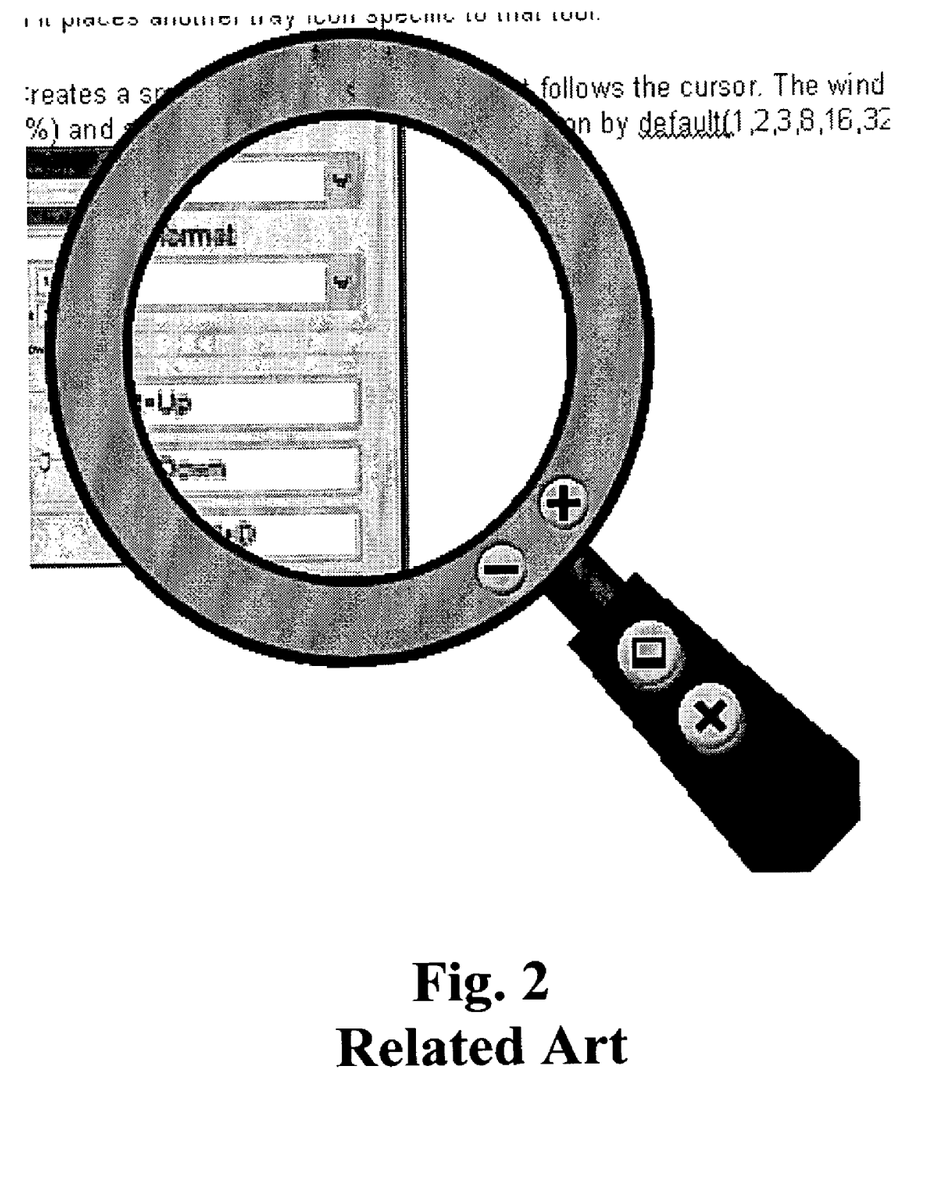
FIG. 2 is a screenshot showing another Related Art magnifier product.

"Lens" is a tool offered by ABF Magnifying Tools (http://www.abfsoft.com/magnifying-tools.shtml) which creates a caricature of a magnifying glass, as seen in Related Art FIG. 2. The user can reposition the glass by dragging and use it to selectively zoom-in on areas of the screen. A user can adjust the magnification level by clicking the + & − buttons. This tool takes a static screen shot at the time of activation. If anything changes on the screen, it is not reflected in the zoomed image.

Figure 3:
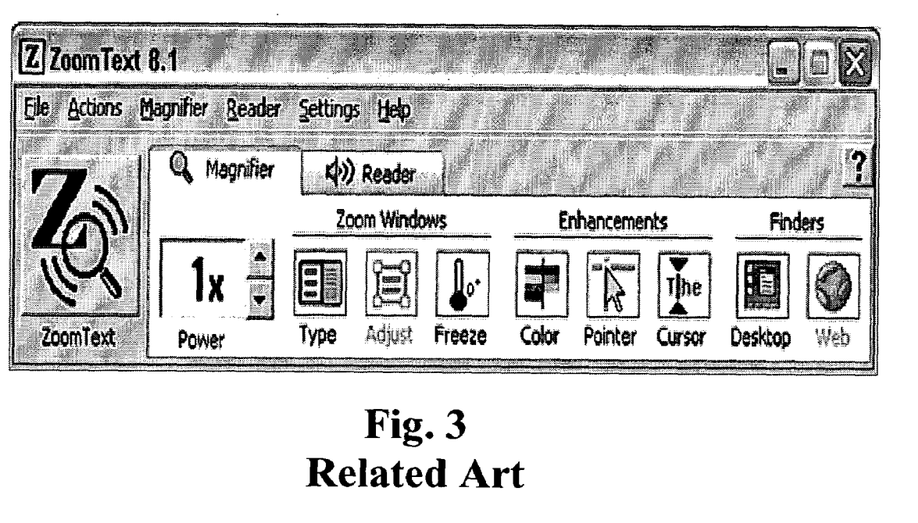
FIG. 3 is a screen shot showing an on-screen tool bar window of a Related Art magnifier product.

Another example of a known accessibility specialty application is ZoomText 8.1, by AI² (http://www.aisquared.com/index.htm). When application is launched, a modal control panel type user interface (UI) appears, as shown in Related Art FIG. 3.

The magnifier/zoom features of ZoomText 8.1 have several modes:

A Full Screen Mode magnifies the entire screen incrementally. As the mouse nears the edges of the screen, panning is initiated automatically.

An Overlay Mode creates a resizable square window in the bottom right hand corner of the screen. The mouse tracks in the regular (1:1) view and that movement is mirrored in the magnified view. As the mouse nears the edges of the screen, panning is initiated automatically within the zoom window.

A Lens Mode creates a floating resizable square window that moves with the mouse cursor. A Line Mode creates a horizontal band across the screen that moves up and down with changes in the Y coordinates of the mouse cursor. Dynamic updating occurs within the magnification window to reflect changes in the screen content during use, and interaction with underlying application windows is available through the magnification window, i.e., mouse and keyboard input are permitted to pass through the magnifier to the underlying window.

A Docked Mode creates a resizable band (outlined in black) positioned against either the top, bottom right or left edges of the screen. Mouse movement is tracked only in the zoomed view, while the 1:1 view is locked.

When enabled, a Freeze It tool allows the user to draw a resizable box on the screen and lock down ("freeze") its position. The predefined box view locks the zoom position to particular X and Y coordinates. If content changes within the area that is magnified, then it is reflected in the magnified content within the box. Freeze mode is available only in the "Full Screen" magnifier mode. In the full Screen mode, there is no lens; the whole screen is magnified and the mouse pans to "off-screen" areas.

Known display screen magnifiers are less than ideal in terms of their simplicity and convenience, and the intuitiveness of their use. Also, the manner in which some magnifiers are implemented renders them highly fragile, i.e., susceptible to malfunction in the event of operating system/driver updates and patches.

It would be desirable to have a robust computer implemented display screen magnifier which behaves more like an actual optical lens magnifier in terms of being able to "float above" the computer desktop and other open windows, to provide a magnified view of what is beneath it in a natural and intuitive way, and to permit uninhibited viewing and interaction with the underlying desktop/windows.

Implementing a magnification application intended for use with an operating system that provides a windows-based graphical user interface (GUI), e.g., a Microsoft's Windows® operating system, presents certain challenges. If the magnifier is created as a conventional window, the magnification window itself becomes a part of the desktop when it is opened. As a result, system calls to get desktop images for magnification will include the magnifier window itself (and not that portion of the GUI underneath it). Use of such system calls to do magnification, as in the Windows XP magnifier, lead to an infinity mirror effect. The result from a user perspective is that he/she is precluded from obtaining a magnified view of what lies beneath the magnification window.

A number of available magnification applications, such as the previously mentioned ZoomText product, have dealt with the above-described difficulty using a technique known as driver chaining. With this approach, a selected portion of the screen content composited by the operating system is intercepted and manipulated by the kernel level magnifier before going to the video display driver. With screen reading or screen magnification software, assistive technology vendors (ATVs) essentially locate the display driver, get the information needed for it, then pass the sometimes modified Display Driver Interface (DDI) calls to the original display driver. (Certain remote control software also uses this technique to intercept information being passed to a remote computer.) The DDI interception technique is called driver chaining. The chained driver intercepts the DDI calls from GDI to the display driver and manipulates the calls in such a way as to magnify a part of the screen. As far as the Windows® operating system is concerned, the superimposed magnifier output is simply not there, so calls to copy portions of the desktop will not see it.

Because driver chaining intervenes with a preestablished operating system/driver relationship, it may not be officially supported by the operating system supplier, e.g., Microsoft. As a result, the technique tends to be very fragile and prone to malfunction, e.g., if the operating system is upgraded with new service packs or drivers. Additional information concerning driver chaining, and its application in screen magnifiers and other assistive technology products, can be found on the Microsoft Developers Network (MSDN), at http://msdn-.microsoft.com/library/default.asp?url=/library/en-us/dnacc/html/atg_driverch ain.asp.

Changing settings for a computer display magnifier is slow and inconvenient through a traditional control panel. It would be highly advantageous if the user was able to perform basic magnifier control functions on-the-fly, without losing task context or requiring access to a control panel or otherwise interacting with on-screen tools/objects.

The ability to activate, deactivate, position and adjust the size and/or magnification level of a magnifier, without taking focus away from open windows would be highly beneficial. Magnifier settings could be easily changed if the magnifier took focus and accepted mouse/keyboard input. However, this has the problem of returning focus to the application of interest once the user is finished adjusting settings. When the application is made active and returns to the foreground, it may not be in the same state and the keyboard focus may be on a different control.

SUMMARY OF THE INVENTION

The present invention provides software/firmware based systems and methods, executable on a data processing device (e.g., a general or special purpose computer) provided with display screen and user input device (e.g., a pointing device such as a computer mouse, trackball or touch pad, or a computer keyboard). These systems and methods serve to provide a means by which a user may conveniently, selectively enlarge portions of the content of the screen display. New approaches to providing such a display screen magnifier are provided in order to address one or more shortcomings of known magnifiers as described above.

A magnifier in accordance with the invention is controllable by a user to magnify selected portions of a desktop and windows open on the screen. A moveable magnifier frame is provided, within which a magnified image is presented. The magnified image corresponds to screen content located within a magnification region underlying the magnifier frame, magnified to a set level of magnification.

A magnifier in accordance with the invention is controllable, on-the-fly, through use of a user input device. At least one operational parameter of the magnifier can be adjusted, without interaction with on-screen objects and without taking focus away from the desktop or any windows open on the screen. In a particular embodiment of the invention, the on-the-fly controllability of the magnifier includes the ability to the ability to activate and deactivate the magnifier, adjust its magnification level, and adjust the size of its magnification frame.

In accordance with an aspect of the invention, the display screen magnifier is configured to operate by leveraging resources made available by application programming interfaces (APIs) of an operating system, namely a windows style, and a second stage screen content compositing engine associated with the windows style.

In accordance with an aspect of the invention, a magnifier window is created which is effectively invisible to the calls to get a desktop image to be magnified. This enables the magnifier to operate in an intuitive manner, permitting the viewer to view what is directly beneath the magnifier, and to interact with the magnifier, without taking focus away from open application windows and/or the desktop. An embodiment of the invention makes advantageous use of windows styles made available by the APIs of Microsoft Windows® 2000 and XP operating systems. In this manner, the need for use of fragile driver chaining techniques is avoided.

The above and other objects, features and advantages of the present invention will be readily apparent and fully understood from the following detailed description of preferred embodiments, taken in connection with the appended drawings.

DETAILED DESCRIPTION OF THE PREFERRED EMBODIMENTS

An on-screen magnifier according to the invention includes a moveable magnifier frame within which a magnified image is presented. The magnified image corresponds to screen content located within a magnification region underlying the magnifier frame, magnified to a set level of magnification.

A display screen magnifier in accordance with an embodiment of the invention is configured such that while it is activated, it remains on top of the desktop and any other open windows of a screen display. It passes events of a user input device (e.g., a mouse or keyboard) to windows located beneath the magnifier, and dynamically updates the magnified image to reflect changes in underlying screen content. Such a display screen magnifier may be embodied in software or firmware executed on a general purpose computer or other data processing device provided with a display screen and user input device.

An aspect of the invention involves achieving the above-described behavior by leveraging resources made available through existing application programming interfaces (APIs) of an operating system, particularly a windows style, and a second stage screen content compositing engine associated with that windows style. As used herein, "windows style" broadly encompasses any set of parameters specifying the functional and/or visual characteristics of a window which is to appear as part of a graphical user interface (GUI), including sets of parameters included within one or plural designated windows styles specified within a set of APIs. The inventive approach can be used in lieu of fragile driver chaining techniques.

In an exemplary embodiment of the invention, the magnifier comprises a magnify window created with the following extended window styles, which are provided as part of the APIs of Microsoft's Windows® 2000 and XP operating systems for personal computers:

WS_EX_TRANSPARENT: This windows style specifies that the window will not be painted until windows beneath this window are painted. This allows a "snapshot" of the screen below the magnifier to be taken before the magnifier is drawn.

WS_EX_LAYERED: When this style is used in combination with the WS_EX_TRANSPARENT style, the magnifier window will not receive user input from the mouse or keyboard; all input is passed to the applications below the magnifier. When the magnifier window is created as a layered transparent window, pointing device (e.g., mouse) events will be passed to other windows underneath the layered window. Also, this windows style optimizes per-pixel alpha blending which can be used to give the magnifier an alpha blended frame. This characteristic can be used to give the user a visual clue that the magnifier is "floating" above the desktop.

WS_EX_NOACTIVATE: This windows style also makes the window so that it doesn't take "focus." That is, if the magnifier window is provided as a window that ordinarily becomes visually highlighted (e.g., a regular window provided with a title bar), the window will not become visually highlighted (e.g., lit-up) as an active window upon clicking within it with a pointing device (e.g., mouse). The user can click through the magnifier. Also, keyboard events (input) will not be captured by the magnifier. This permits the user to interact freely with an application window positioned below the magnifier. Also, with this style, the magnifier does not appear on the taskbar.

WS_EX_TOOLWINDOW: Addition of the style makes it so the magnifier also does not show up in the alt-tab listing of open windows/applications.

WS_EX_TOPMOST: This Windows style maintains the magnifier as the topmost window. Without it, the utility of the magnifier could be diminished by the magnifier disappearing behind other windows.

Additional information on these and other extended windows styles included in the APIs of Microsoft's Windows® operating systems can be found on the Microsoft Developers Network (MSDN), e.g., at http://msdn.microsoft.com/library/default.asp?url=/library/en-us/winui/winui/windowsuserinterface/windowing/windows/windowreference/windowfun ctions/createwindowex.asp.

An exemplary magnifier window creation function that may be used is set forth below:

```
// Create Magnifier window
HWND hwnd=::CreateWindowEx(
    WS_EX_NOACTIVATE | WS_EX_TRANSPARENT |
    WS_EX_LAYERED | WS_EX_TOPMOST |
    WS_EX_TOOLWINDOW,
        wndClass.lpszClassName, L"",
        WS_POPUP | WS_VISIBLE | WS_DISABLED,
        0,0,0,0,
        NULL, NULL, hInstance, 0);
```

Figure 5:
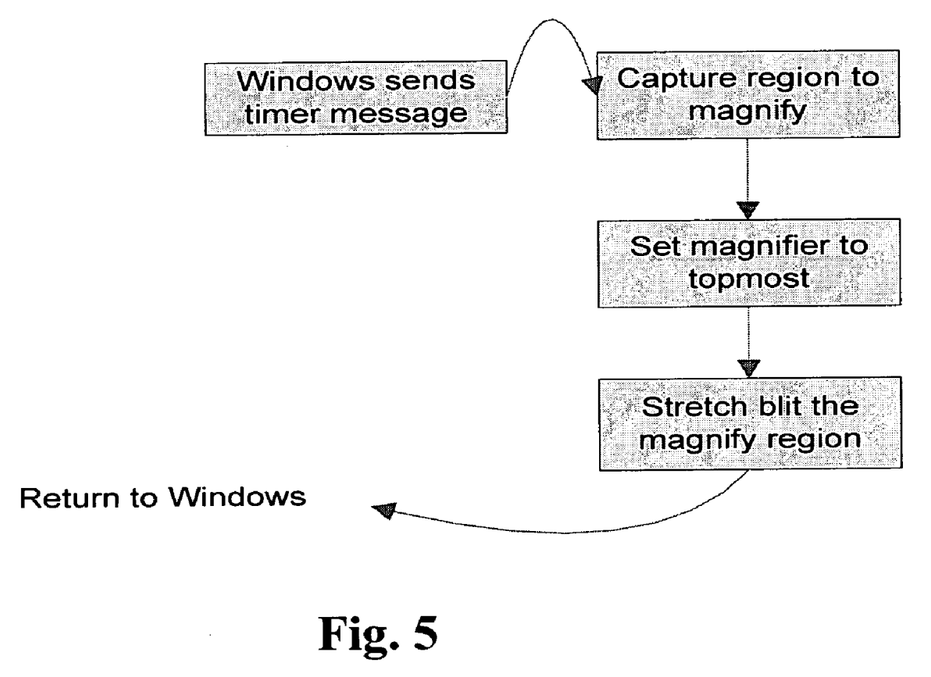
FIG. 5 is a flow-diagram illustrating a sequence of operational process steps performed by a screen magnifier embodiment of the invention.

An operational process of a magnifier in accordance with an aspect of the invention is illustrated in FIG. 5. Once the magnifier window is activated, a timer is set so that the magnifier receives a timer message at a predetermined rate (e.g., about 15 to 24 times a second). In one embodiment, the timer interval is set at 15 milliseconds, or 67 times per second. The magnifier uses the timer message to continuously update the magnifier image to reflect changes in underlying screen content occurring while the magnifier is in use (activated). An update frequency in the indicated range should permit the magnified image to change relatively smoothly as the magnification frame is moved on the screen, or if there is an animation playing in a window below it, thereby emulating the appearance of an actual optical magnifying glass held and moved in front of the screen. As shown in FIG. 5, when a timer message is received, the region to be magnified is captured, the magnifier window is set to topmost and then the capture region is drawn (e.g., "stretch blit") into the magnifier at the proper magnification level.

An embodiment of the invention makes advantageous use of the fact that USER32 (the Win32 window manager) implements a relatively simple composition engine for carrying out a second stage of composition of screen content when Transparent windows are created. This is a "second stage" of composition in the sense that it is different from, and in addition to, the ordinary or normal desktop composition process. The normal composition process employed by Microsoft's Windows® operating systems follows what is sometimes referred to as a modified painters algorithm. Windows are painted to the desktop in reverse z order (top to bottom). Aggressive "clipping" is used to confine the areas of the screen to be redrawn to areas where content is being added or change has occurred, to thereby avoid screen flicker and reduce the amount of actual painting/drawing work.

When a window uses drop shadows, transparency or any other effect that requires Windows® to merge the window's pixels with whatever is "behind" it, Windows® creates intermediate bitmap buffers for the desktop and the transparent windows, respectively. The contents of these buffers are then "composed" to create the final output. Calls to take a snapshot of the desktop (e.g., GetDC(NULL)), and to stretch blit (StretchBlt) from the desktop, will use the desktop buffer, not the desktop resulting from the second stage composition process. By making itself a Windows® "Transparent" window (even if its opacity is set to 100%), the magnification window both enables the second stage composition process, and puts itself above the main desktop. Use of the "Topmost" windows style will keep the magnifier topmost, by preventing a new window from subsequently appearing and setting itself as topmost.

A magnifier in accordance with the invention presents a resizable magnification frame which is moveable on the display screen and within which is presented a magnified image corresponding to screen content located in a magnification region underlying the magnification frame. In the principal embodiment described herein, the magnification frame/lens is pinned to and centered on the pointing device cursor, so as to move with the same. In other embodiments, the magnification frame (which bounds the virtual "lens" of the magnifier) could be made movable independently of the pointing device cursor.

A computer display magnifier in accordance with an aspect of the invention "floats" above the desktop and any open windows, and does not take focus away from the desktop or any open window. As previously described, these are desirable characteristics. They present the problem, however, of how to resize the magnifier and change its magnification level. For a normal application windows this would be trivial; resizing would be achieved by clicking and dragging window borders, and the magnification level could be changed with on-screen controls. However, using methods like this results in focus being away from other open windows, which might have unintended and undesirable consequences. Settings could also be changed through a control panel page, but this approach is cumbersome and time-consuming, especially for a user who may desire the frequent intermittent assistance of a magnifier during the course of carrying out various tasks on a computer.

In accordance with an aspect of the invention, a magnifier is provided which can be toggled on and off by the user substantially instantaneously, by clicking a designated magnify button provided on a user input device (e.g., a computer mouse or keyboard). The magnifier control switch may be a dedicated button (or other type of user actuable switch), or a button assigned by the user to the magnify feature.

Figure 6:
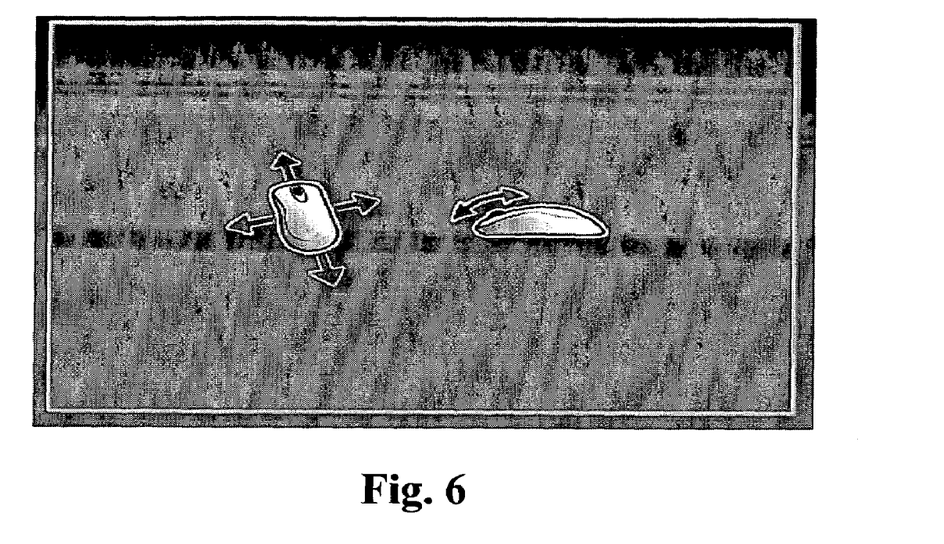
FIG. 6 is a screen shot illustrating a moveable and adjustable magnification frame of the invention, including superimposed hint graphics appearing during an adjustment mode of the magnifier.

In an exemplary embodiment, once the magnifier is displayed on the screen, the user can hold down the magnify button for a predetermined short period of time (e.g., about a half second) to enter an adjustment mode. To signal to the user that the adjustment mode is active, a graphic, as shown in FIG. 6, can be caused to appear in (e.g., fade into) the magnify lens area bounded by the magnifier frame. While in the adjustment mode, the user can change the magnification and size of the lens. As depicted in FIG. 6, the graphic which appears on the screen may provide a visual indication of suitable user inputs (e.g., mouse movements and scroll wheel rotations) for effecting adjustment of the magnifier. The user does not, however, interact with those graphics to effect the adjustments. An exemplary scheme for changing the size of the magnification lens/frame is outlined below.

With the magnifier activated, changes to a width dimension of the magnifier frame may be effected in the following manner. If the user depresses and holds down the mouse button assigned to the magnify function, and moves the mouse a predetermined distance in a predetermined direction (e.g., 50 pixels to the RIGHT), the magnifier frame can be caused to increase in size (e.g., at one or both of its right and left hand sides) at a rate corresponding to the movement of the mouse in that direction. If the user depresses and holds down the designated mouse button, and moves the mouse a predetermined distance in a second predetermined direction (e.g., 50 pixels to the LEFT), the magnifier frame can be caused to decrease in size (e.g., at one or both of the right and left hand sides) at a rate corresponding to the movement of the mouse in that direction.

With the magnifier activated, changes to a height dimension of the magnifier frame may be effected similarly. If the user depresses and holds down the designated mouse button and moves the mouse a predetermined distance in a third predetermined direction (e.g., 50 pixels DOWN), the magnifier frame will start to increase in size (e.g., at one or both of its bottom and top sides) at a rate corresponding to the movement of the mouse. If the user depresses and holds down the designated button and moves the mouse a predetermined distance in a fourth predetermined direction (e.g., 50 pixels UP), the magnifier frame will start to decrease in size (e.g., at one or both of the bottom and its top sides) at a rate corresponding to the movement of the mouse.

Vertical and horizontal changes to the size of the magnifier frame can be made simultaneously, by combining the mouse movements described above. The size settings of the magnifier may be preserved so that the next time the magnifier is launched, the magnifier frame/lens will be the same size that it was before it was last closed.

With the magnifier activated, the level of magnification may be changed in the following manner. If the user depresses the designated mouse button, then while holding the button down scrolls the mouse wheel towards herself, the magnification level will decrease within any bound set by a minimum magnification level (e.g., 1:1 magnification ratio). If the user depresses the designated mouse button, then while holding the button down scrolls the mouse wheel away from herself, the magnification level will increase (within any bound set by a maximum magnification level). In an exemplary embodiment, the magnifier level is incrementally adjustable to the following levels: 1.5×, 2×, 3×, 4× and 5×.

With the magnifier deactivated (off), depressing then releasing the designated mouse button will cause the magnifier to be activated and appear on the screen. A subsequent momentary depression of the button will instantly deactivate the magnifier. If, while the magnifier is deactivated, the user depresses the designated button then while holding the button down scrolls the mouse wheel toward or away from herself, the scroll events will go to the application that has focus. When the user releases the magnify button, the magnifier will be activated and appear on the screen.

An exemplary magnifier in accordance with the invention is implemented using extended windows styles available as part of the APIs provided by Microsoft's Windows® 2000 and XP operating systems. In particular, the magnifier may be configured as a single layered (WS_EX_LAYERED), transparent (WS_EX_TRANSPARENT) window which periodically captures a portion of the screen image, stretches it, and updates its window image. These particular window attributes allow the window to "float" above the desktop and any open application windows. With these style flags set, the magnifier never receives focus. Instead, software "hooks" are used to selectively obtain user input from the mouse, which is used to make adjustments to the magnifier without interrupting ongoing user tasks and application processes.

In the principal embodiment described hereinabove, a computer mouse is used to provide an input button which is used in conjunction with mouse and scroll wheel movement to effect adjustments to the magnifier. It will be understood, however, that various other known user input devices could be used for providing on-the-fly controllability of the magnifier, including trackball devices, computer keyboards, touch pads and joysticks.

In accordance with an exemplary embodiment of the invention, once the magnify button is held down long enough to enter the adjustment mode, a mouse hook is set. The mouse hook "eats" the mouse-generated input and redirects it to the magnifier window, which normally receives no input. The mouse input (mouse movement and scroll wheel rotation information) is used to adjust the settings. Any underlying "in focus" application receives no mouse movement or scroll wheel notifications while the mouse hook is set. The hook is released as soon as the adjustment mode is exited, which occurs immediately upon release of the button, so that the application in focus can once again receive mouse input. The focus application never loses focus, so there are no unintended side effects. In the described exemplary magnifier, the settings are stored as three registry values: magnification level; width of magnifier, in pixels; and height of magnifier, in pixels.

Information concerning "hooks" usable with Microsoft's Windows™ operating systems can be found on the Microsoft Developers Network (MSDN), e.g., at:

http://msdn.microsoft.com/library/default.asp?url=/library/en-us/dnwui/html/msdn_hoo ks32.asp.

See also:

http://msdn.microsoft.com/library/default.asp?url=/library/en-us/winui/winui/windowsus erinterface/windowing/hooks.asp.

Software suitable for implementation of an exemplary embodiment of the inventive magnifier may be described in terms of two primary classes: MagnifierWindow, which implements the window procedure, creation, update timer and destruction; and MagnifierRenderer, which implements screen image capture and window rendering.

The MagnifierWindow class creates a window with the WS_EX_LAYERED and WS_EX_TRANSPARENT styles (among others). On startup, it determines the initial magnifier size and magnification level and initializes a MagnifierRenderer object. It also creates a timer object, and on each timer tick, calls the Update ( . . . ) method on the MagnifierRenderer object to update the image and position of the magnifier on the screen. The magnifier window closes itself when the user clicks the magnifier mouse button a second time and saves the size and magnification level. The HWND associated with the MagnifierWindow object is released when the WM_CLOSE message is received. WM_QUIT is posted to the thread's message pump when the window is destroyed. The MagniferWindow can be provided with the previously described magnifier adjustment mode, entered by depressing and holding down the designated magnifier mouse button. The following is an exemplary listing of constituent methods and message handlers that may be included in the MagnifierWindow class:

Constructor: Registers the MagnifierWindow window class and creates an instance of it; loads the mouse hook dll;

Destructor: Checks to see if the HWND associated with the MagnifierWindow was released; unhooks the mouse hook;

GetHWND: Returns the HWND associated with this instance of the MagnifierWindow class (clients can send a WM_CLOSE message to this window to close the magnifier);

WM_CREATE: Determines the best magnifier size (percentage of activation screen resolution, or from registry setting) and magnification level (default 1.5×, or registry setting). Initializes the magnifierRenderer object and creates a window timer for updates;

WM_CLOSE: Destroys the update timer, saves registry settings, calls DestroyWindow;

WM_DESTROY: Posts a WM_QUIT message to the thread's message pump;

WM_NCDESTROY: Uninitializes class member variables;

WM_TIMER: If screensaver is running, closes magnifier; updates the on-screen-display (OSD) animation (the on-screen-display graphics that appear when the size and magnification level are being adjusted), if active; gets the current mouse pointer position and calls MagnifierRenderer::Update ( . . . ) to update the magnifier image and position;

WM_DISPLAYCHANGE: Updates magnifier dimensions when the screen dimensions are changed;

WM_ERASEBKGND: No Operation. When this message is received, control is immediately returned to Windows as an optimization.

WM_MOUSEWHEEL: This message is only received from the mouse hook (when active); changes the magnification level;

WM_MOUSEMOVE: This message is only received from the mouse hook (when active); changes the magnifier window (frame) size;

On Magnifier ButtonDown: Enters resize mode; hooks the mouse; initializes the OSD fade-in;

On Magnifier ButtonUp: Exits resize mode; unhooks the mouse, initializes the OSD fade-out; if neither magnification or size was altered, exits the magnifier;

SetBestWindowSize: Given a desired width and height, sizes the magnifier window to the best fit; each window edge changes in increments of 2 times the current magnification (i.e. at mag=1.5, window width is changed in 6 pixel increments) in order to prevent image jitter while zooming in and out; and MouseHook: Mouse hook callback; forwards mousewheel and mouse move messages to the magnifier window. A mouse hook is used to prevent underlying applications from receiving mouse input while altering the size and magnification of the magnifier.

MagnifierRenderer

The MagnifierRenderer class performs the screen capture and magnification rendering operations. It is associated with a window handle and given a magnification level. An exemplary listing of constituent methods that may be included in the MagnifierRenderer follows:

Constructor: default initialization;

AttachWindow: Associates the MagnifierRenderer object with a window handle. The width and height of the magnifier equals the width and height of the specified window at the time of the call. Images representing the magnifier frame and lens mask are generated at this time. Their width and height match the specified window's width and height. These two images are persisted for fast compositing while rendering. This method may be called repeatedly to cause the MagnifierRenderer to resize itself from the window size;

SetMagnification: Sets the magnification level. This method may be called at any time to change the magnification level;

GetMagnification: Returns the current magnification level;

SetOSDAlpha: Sets the opacity of the adjustment-mode on-screen-display graphic indicating suitable user inputs for adjusting the magnifier;

GetOSDAlpha: Gets the opacity of the adjustment-mode on-screen-display graphic;

Update: Moves and updates the magnifier. If the window size has changed, it creates new frame and lens mask bitmaps. If the capture bitmap doesn't change, no update occurs, saving many cycle of image update.

Capture: Two capture buffers are provided—current and a previous; a new current buffer is captured and a message is returned indicating whether the current and previous buffers are different;

Render: Stretches the current capture image, masks off the unwanted pixels, copies the frame on top;

CreateFrameAndMask: Creates the lens mask, frame, current capture and previous capture bitmaps, sized relative to the current window width and height;

GetBitmapSize: Returns the width and height of an HBITMAP in a SIZE structure;

GenerateBorder: Takes nine component bitmaps and fills a destination bitmap with them;

MaskBitmap: Masks pixels in the destination bitmap using the specified mask bitmap—destination pixels are multiplied by mask alpha values;

AreBitmapsDifferent: Returns whether two bitmaps are different, by comparing pixel values to determine if the capture area has changed; if the capture area has not changed the magnifier doesn't need to updated as an optimization;

Stretch_1×5: Stretches a bitmap by a factor of 1.5.

Exemplary processes and functionalities of the MagnifierRenderer are described below, with reference to FIGS. 7-10.

Initialization

Figure 7:
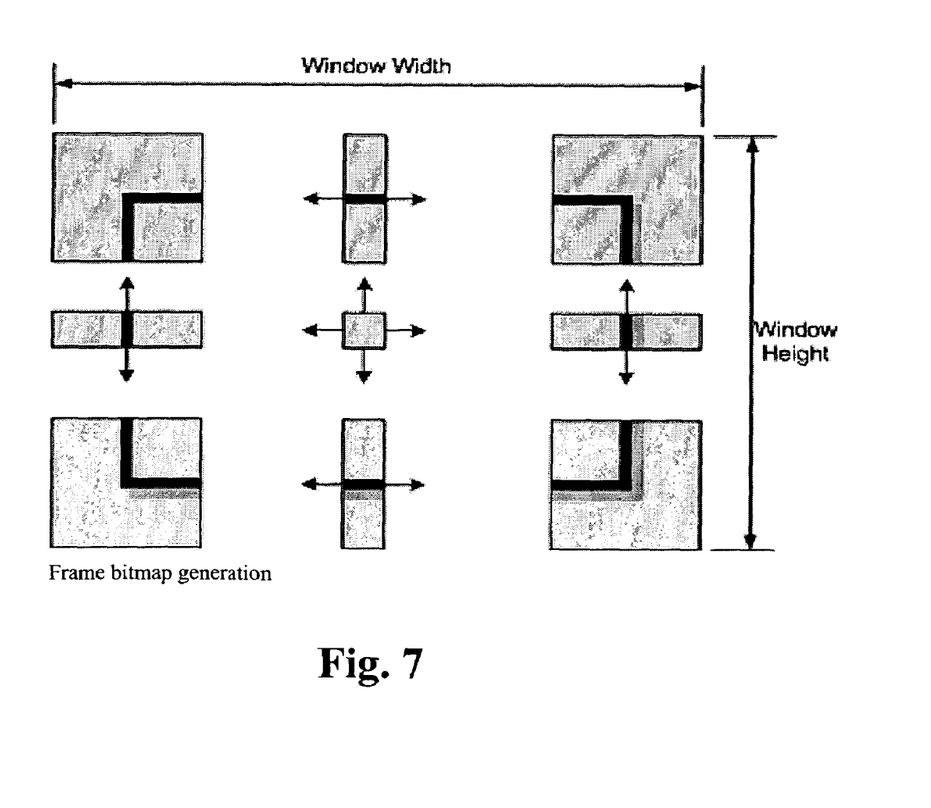
FIG. 7 is a diagrammatic representation of a frame bitmap generation process in accordance with an aspect of the invention.

Referring to FIG. 7, AttachWindow ( . . . ) saves the specified window handle and creates the images for the frame and lens mask. The frame and lens mask images match the window width and height. The frame is composed of nine individual elements. The center elements are stretched to make up a frame of the required size. Note that the shaded areas in these images represents transparent pixels.

Figure 8:
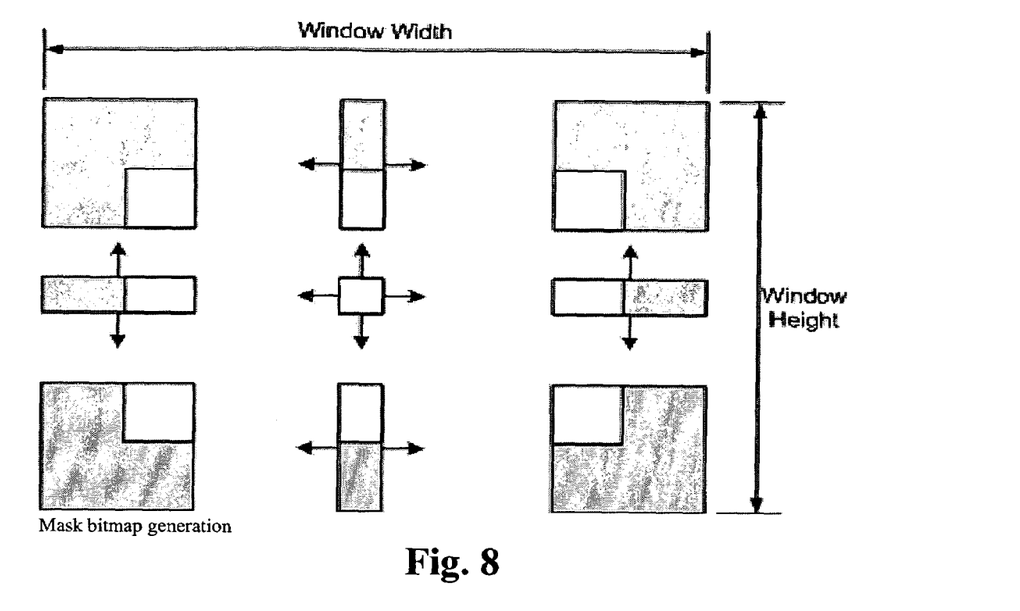
FIG. 8 is a diagrammatic representation of a mask bitmap generation process in accordance with an aspect of the invention.

Referring now to FIG. 8, after the frame image is created, a lens mask image is created in the same manner. The opaque pixels in the mask represented by the non-shaded area define a region where the stretched image will appear. Note that the shaded areas in these images represented transparent pixels.

The MagnifierRenderer::Update ( . . . ) method checks to see whether the owner window dimensions have changed, and if so, updates the frame and lens mask images to match the new size. Clients may call AttachWindow ( . . . ) to explicitly cause the frame and lens mask images to be recreated.

Capture

Figure 9A:
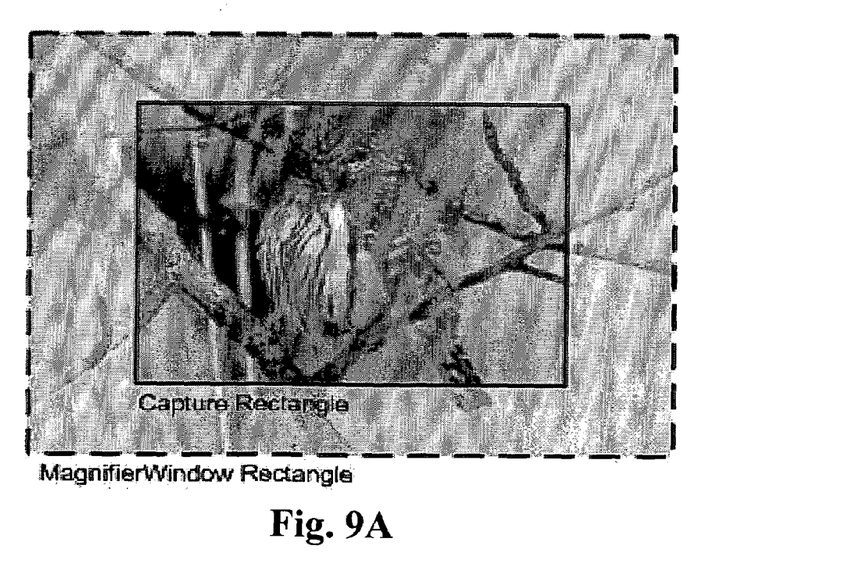
FIG. 9A is a diagrammatic view, including a representational image portion selected for magnification, showing the relationship of a magnifier frame ("MagnifierWindow Rectangle") and an underlying magnification region ("Capture Rectangle").

Referring to FIG. 9A, the source image capture rectangle is centered at the current mouse pointer position. The width of the illustrated Capture Rectangle (which defines the magnification region) is the width of the Magnifier Window Rectangle (magnifier frame) divided by the level of magnification. Likewise, the height of the CaptureRectangle is the height of the MagnifierWindow Rectangle divided by the level of magnification. The Capture method copies the screen image and returns whether the captured image is different from the previously captured image. The captured image is stored for use while rendering.

Render

Figure 9B:
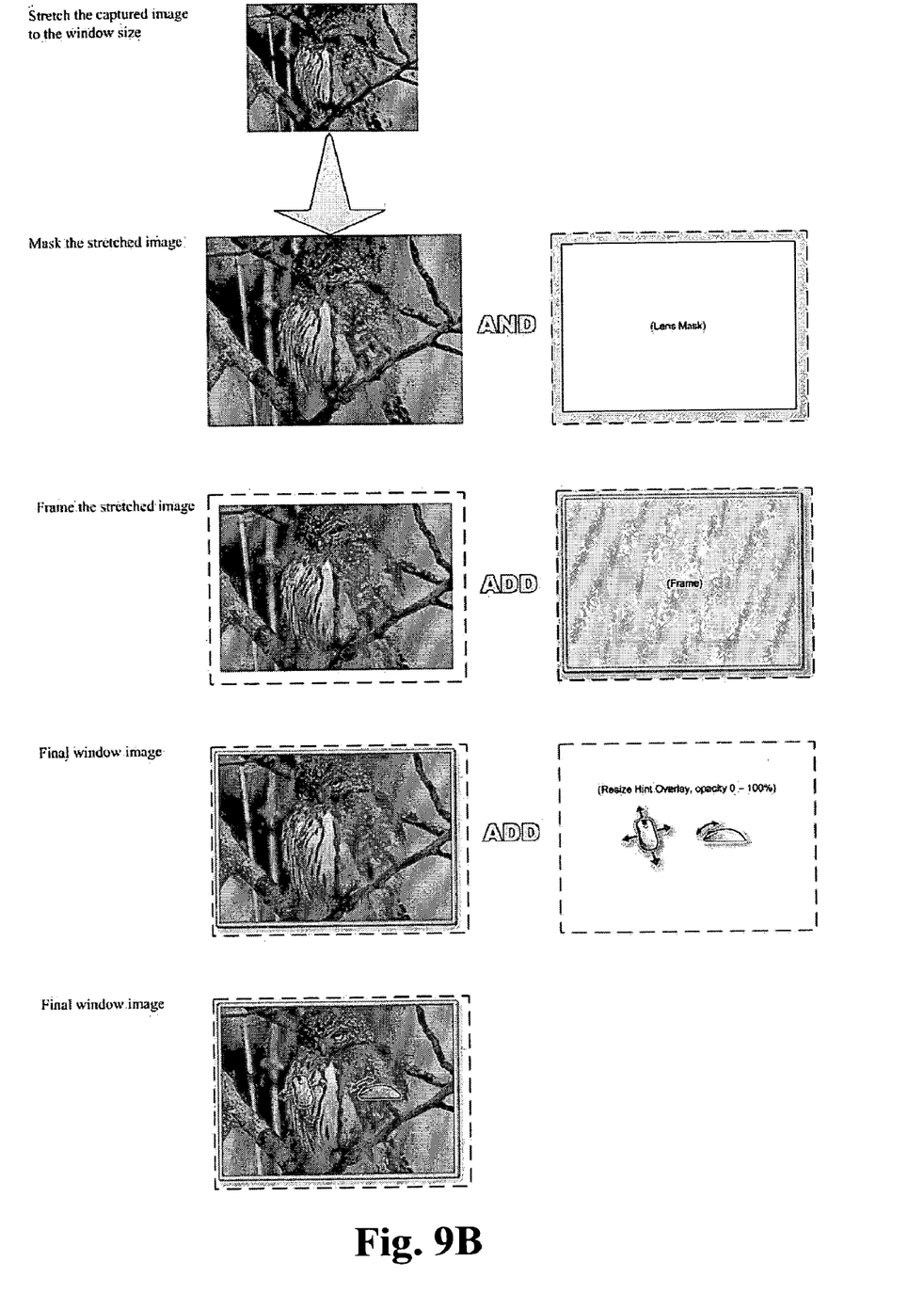
FIG. 9B is a sequence of views illustrating stages of a process of the invention for generation and presentation of a magnified image corresponding to the image portion shown in FIG. 9A.

As shown in FIG. 9B, first the captured image is stretched to the window size. Next, the stretched image is masked with the lens mask. Next, the frame is applied to the stretched image. Upon entering the adjustment mode, the magnification adjustment and frame resizing hint graphics (preferably transparent—graphic images represent transparent pixels) are added to the framed image. The hint graphics appear only when the adjustment mode is active.

Update

If the image and position of the magnifier have changed, then a call is made to ::UpdateLayeredWindow (image & position). If only position has changed, a call is made to ::UpdateLayeredWindow (position). If only the image has changed, a call is made to ::UpdateLayeredWindow (image). The window is set to topmost in the Update( ) function.

1.5× Stretching Algorithm

A standard Windows API can be used to stretch bit images to the magnifier frame at different levels of magnification. In one embodiment of the invention, a default magnification level of 1.5× utilizes a different algorithm for optimizing speed and improving the appearance of the magnified image.

Figure 10A:
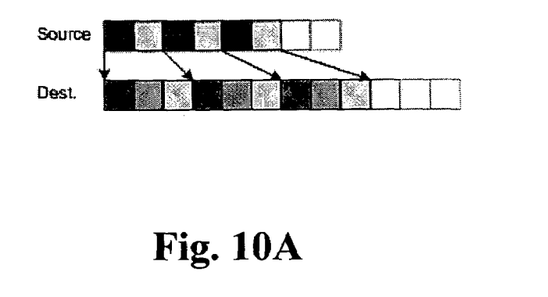
FIGS. 10A-10C are diagrammatic views illustrating a process carried out by a 1.5× "stretching" algorithm according to an aspect of the invention.

As shown in FIG. 10A, when stretching by a factor of 1.5, two source pixels become three pixels in the destination. The first source pixel is copied to the first destination pixel. The second source pixel is copied to the third destination pixel. The second destination pixel is set as the average of the first two source pixels.

Figure 10B:
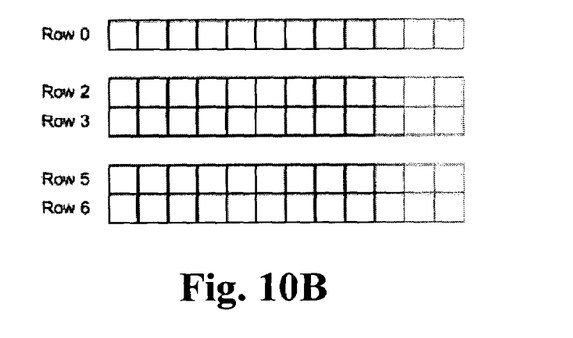
Figure 10C:
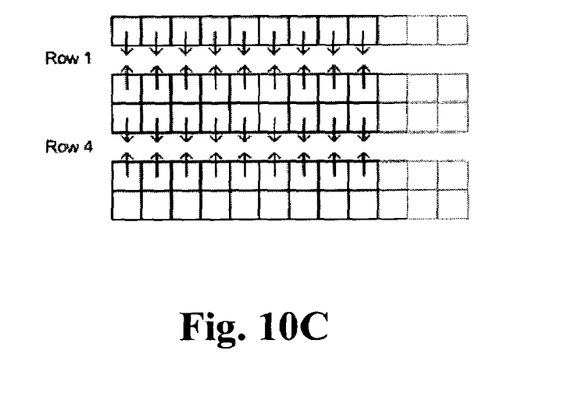

The stretching algorithm used by the magnifier stretches the source rows 0, 1, 2, 3, 4, . . . into the destination rows 0, 2, 3, 5, 6, . . . respectively as shown in FIG. 10B. The algorithm then goes back through and fills in rows 1, 4, 7, etc. by averaging the pixels from one row above and below the destination pixel, as depicted in FIG. 10C.

The present invention has been described in terms of preferred and exemplary embodiments thereof. Numerous other embodiments, modifications and variations within the scope and spirit of the appended claims will occur to persons of ordinary skill in the art from a review of this disclosure. In the claims, any use of the labels for algorithm variables appearing in the specification is for convenience and clarity and is not intended to have any limiting effect.

The invention claimed is:

1. A machine readable storage medium containing thereon instructions which, when executed by a data processing device having a display screen and user input device, serve to configure the device to provide a display screen magnifier which is controllable by a user to magnify selected portions of a desktop including windows open on said screen, said magnifier providing a moveable magnifier frame within which a magnified image is presented, said image corresponding to screen content located within a magnification region underlying said magnifier frame, magnified to a set level of magnification, said input device including an adjustment mode that is activated and deactivated by user selection, a graphic appearing on said display screen when said adjustment mode is activated, said graphic indicating that said adjustment mode is activated, said magnifier being controllable by a user through use of said input device, when said adjustment mode is activated, to independently adjust the magnification level of the magnifier and a size of the magnifier frame, without user interaction with on-screen objects and without taking focus away from said desktop or any windows open on said screen, said graphic including direction arrows associated with adjusting the size of the magnifier frame and the magnification level of the magnifier, said input device being switchable between a magnifier and an on-screen application that has focus, said input device directing input device actions to said on-screen application that has focus when said input device is switched to said on-screen application that has focus.

2. A machine readable storage medium according to claim 1, wherein when said adjustment mode is activated a hook is caused to be set which temporarily directs input of said input device to said magnifier for altering said magnification level of the magnifier and said size of the magnifier frame.

3. A machine readable storage medium according to claim 2, wherein said input device is a computer pointing device, and said hook is a hook of said computer pointing device.

4. A machine readable storage medium according to claim 3, wherein the hook directs to said magnifier at least one of pointer movement data and scroll wheel rotation data of said computer pointing device, for altering said magnification level of the magnifier and said size of the magnifier frame.

5. A machine readable storage medium according to claim 4, wherein the hook directs to said magnifier said pointer movement data, which is used to adjust a size dimension of the magnifier frame.

6. A machine readable storage medium according to claim 4, wherein the hook directs to said magnifier said scroll wheel rotation data, which is used to adjust a magnification level of the magnifier frame.

7. A machine readable storage medium according to claim 1, wherein said input device comprises a pointing device, and the position and movement of said magnifier frame correspond to the position and movement of an on-screen cursor of said pointing device.

8. A machine readable storage medium according to claim 1, wherein said magnified image is dynamically updated to reflect changes in underlying screen content occurring while the magnifier is activated.

9. A machine readable storage medium according to claim 1, wherein said magnifier is activated upon actuation of a switch on said user input device, and enters an adjustment mode upon said switch being continuously actuated for a predetermined time period.

10. A machine readable storage medium according to claim 9, wherein, when the magnifier is in said adjustment mode the magnifier presents an on-screen visual indicator that the adjustment mode is active.

11. A machine readable storage medium according to claim 10, wherein said visual indicator provides an indication of appropriate user inputs for effecting adjustment of said magnification level of the magnifier and said size of the magnifier frame.

12. A machine readable storage medium according to claim 11, wherein said visual indicator provides an indication of appropriate user inputs for effecting an adjustment of at least one size dimension of said magnifier frame.

13. A machine readable storage medium according to claim 10, wherein said visual indicator provides an indication of appropriate user inputs for effecting an adjustment of a magnification ratio of said magnifier.

14. A machine readable storage medium according to claim 1, wherein, said display screen magnifier is configured by a windows style of an application programming interface of an operating system, and a second stage screen content compositing engine associated with said windows style.

15. A data processing device having a display screen and user input device, said device being configured to provide a display screen magnifier which is controllable by a user to magnify selected portions of a desktop including windows open on said screen, said magnifier providing a moveable magnifier frame within which a magnified image is presented, said image corresponding to screen content located within a magnification region underlying said magnifier frame, magnified to a set level of magnification, said input device including an adjustment mode that is activated and deactivated by user selection, a graphic appearing on said display screen when said adjustment mode is activated, said graphic indicating that said adjustment mode is activated, said magnifier being controllable by a user through use of said input device, when said adjustment mode is activated, to independently adjust the magnification level of the magnifier and the size of the magnifier frame, without user interaction with on-screen objects and without taking focus away from said desktop or any windows open on said screen, said graphic including direction arrows associated with adjusting the size of the magnifier frame and the magnification level of the magnifier, said input device being switchable between a magnifier and an on-screen application that has focus, said input device directing input device actions to said on-screen application that has focus when said input device is switched to said on-screen application that has focus.

16. A data processing device according to claim 15, wherein the magnifier is capable of activation and deactivation through use of said input device, without user interaction with on screen objects and without taking focus away from said desktop or any windows open on said screen.

17. A data processing device according to claim 15, wherein, said display screen magnifier is configured by a windows style of an application programming interface of an operating system, and a second stage screen content compositing engine associated with said windows style.

18. A method of configuring a data processing device having a display screen and user input device to provide a display screen magnifier which is controllable by a user to magnify selected portions of a desktop including windows open on said screen, said input device including an adjustment mode that is activated and deactivated by user selection, the method comprising:
  displaying a magnifier having a moveable magnifier frame on the display screen;
  magnifying an image within said magnifier to a set level of magnification, said image corresponding to screen content located within a magnification region underlying said magnifier frame;
  independently adjusting, through input by a user through use of said input device when said adjustment mode is activated, the magnification level of the magnifier and the size of the magnifier frame, without user interaction with on-screen objects and without taking focus away from said desktop or any windows open on said screen, a graphic appearing on said display screen when said adjustment mode is activated, said graphic indicating that said adjustment mode is activated, said graphic including direction arrows associated with adjusting the size of the magnifier frame and the magnification level of the magnifier, said input device being switchable between a magnifier and an on-screen application that has focus, said input device directing input device actions to said on-screen application that has focus when said input device is switched to said on-screen application that has focus.

19. A method according to claim 18, wherein the magnifier is capable of activation and deactivation through use of said input device, without user interaction with on screen objects and without taking focus away from said desktop or any windows open on said screen.

20. A method according to claim 18, wherein, said display screen magnifier is configured by a windows style of an application programming interface of an operating system, and a second stage screen content compositing engine associated with said windows style.

* * * * *